United States Patent
Kaytan

(10) Patent No.: US 9,359,486 B2
(45) Date of Patent: *Jun. 7, 2016

(54) PLASTICIZED POLYMERIC COMPOSITIONS

(75) Inventor: Hasan Kaytan, Huerth (DE)

(73) Assignee: ISP INVESTMENTS INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/500,490

(22) PCT Filed: Oct. 4, 2010

(86) PCT No.: PCT/US2010/051273
§ 371 (c)(1),
(2), (4) Date: Apr. 16, 2012

(87) PCT Pub. No.: WO2011/044018
PCT Pub. Date: Apr. 14, 2011

(65) Prior Publication Data
US 2012/0201987 A1    Aug. 9, 2012

Related U.S. Application Data

(60) Provisional application No. 61/249,372, filed on Oct. 7, 2009.

(51) Int. Cl.
*B32B 1/08* (2006.01)
*C08K 5/10* (2006.01)
*C08K 5/3415* (2006.01)
*C08L 27/06* (2006.01)

(52) U.S. Cl.
CPC ............... *C08K 5/10* (2013.01); *C08K 5/3415* (2013.01); *C08L 27/06* (2013.01); *Y10T 428/139* (2015.01); *Y10T 428/249921* (2015.04)

(58) Field of Classification Search
CPC ........ C08K 5/10; C08K 5/3415; C08K 27/06; Y10T 428/139; Y10T 428/249921; C08L 27/06
USPC ............ 428/36.9, 35.7, 34.1, 36.1, 36.5, 221; 524/99, 104
See application file for complete search history.

(56) References Cited

U.S. PATENT DOCUMENTS

| | | | |
|---|---|---|---|
| 3,407,166 A | 10/1968 | Kuceski et al. | |
| 3,451,958 A | 6/1969 | Riedeman et al. | |
| 5,505,956 A | 4/1996 | Kim et al. | |
| 6,001,188 A | 12/1999 | Walsh et al. | |
| 6,193,996 B1 | 2/2001 | Effing et al. | |
| 6,242,500 B1 | 6/2001 | Lan et al. | |
| 6,828,382 B1 | 12/2004 | Loth et al. | |
| 2006/0115515 A1 | 6/2006 | Pirhonen et al. | |
| 2007/0112104 A1* | 5/2007 | Kaytan | 524/99 |
| 2008/0200595 A1* | 8/2008 | Hinault et al. | 524/273 |

OTHER PUBLICATIONS

International Search Report, PCT/US2010/051273, published on Apr. 14, 2011.

* cited by examiner

*Primary Examiner* — Yan Lan
(74) *Attorney, Agent, or Firm* — Thompson Hine LLP; William J. Davis

(57) ABSTRACT

The present invention provides plasticized polymer compositions comprising an 7V-allcyl-2-pyrrolidone and a fatty acid ester. These compositions exhibit enhanced hardness, tensile strength, and/or elongation at break without the use of phthalate-based plasticizers. The plasticized polymeric compositions can be employed in a wide variety of applications, such as in sheeting, tubing, and coatings.

12 Claims, 4 Drawing Sheets

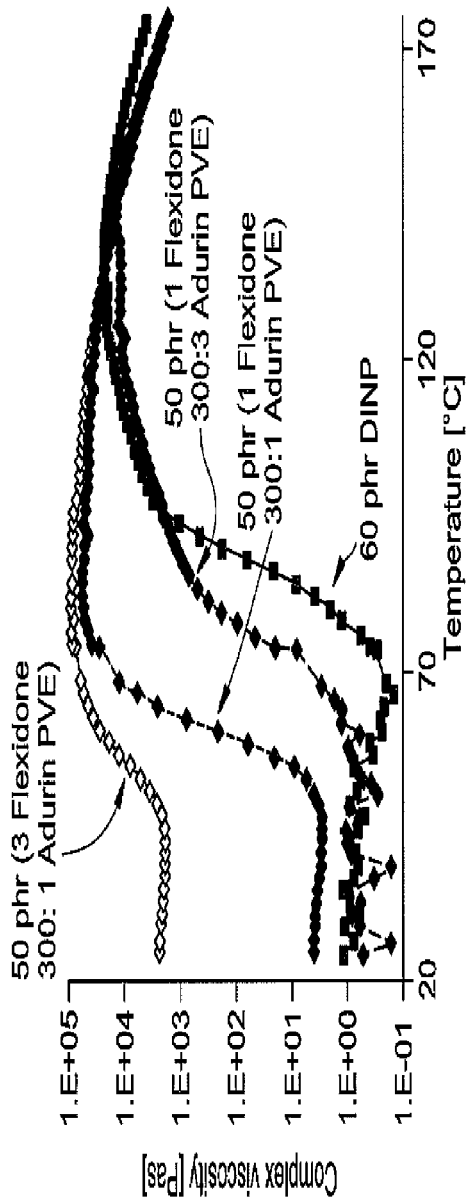
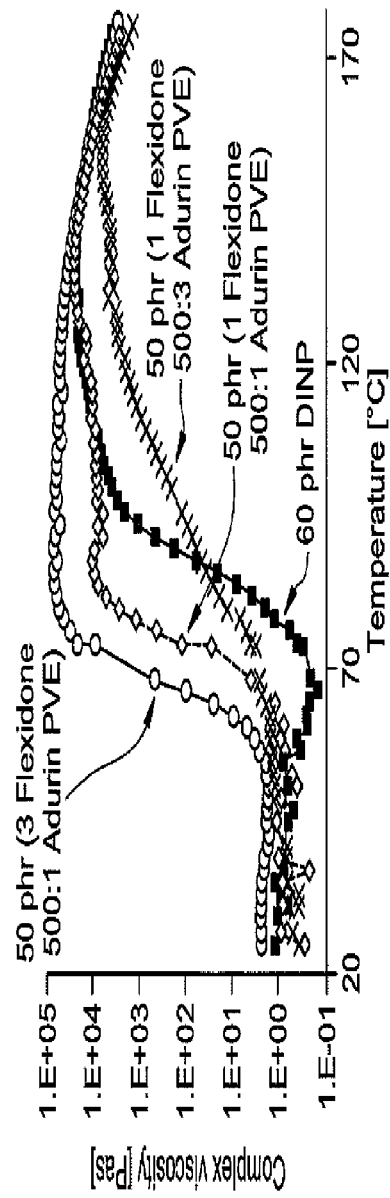

PLASTICIZED POLYMERIC COMPOSITIONS

BACKGROUND OF THE INVENTION

1. Field of the Invention

This invention relates to plasticized polymeric compositions, and, more particularly, to polymeric compositions comprising poly(vinyl chloride) and a plasticizer, the latter consisting of at least one N-alkyl-2-pyrrolidone and at least one fatty acid ester. The plasticizer content is sufficient to increase tensile strength, elongation at break, and/or to lower the cold-crack temperature. The present invention also relates to the abovementioned compositions that are free of heavy metals and solvent, thus exhibit reduced volatile organic compounds (VOC) emissions.

The present invention further relates to the use of these plasticized polymeric compositions in any application benefiting from their advanced properties, including, but not limited to: wire and cable coatings, film, foils, tubing such as medical tubing, roofing membranes, flooring, gaskets such as refrigerator gaskets, paints, adhesives, textile auxiliaries, film coating, fabric, wall coatings, and wall paper coatings.

2. Description of the Prior Art

Poly(vinyl chloride), hereafter referred to as PVC, finds extensive use in many arts. PVC is commonly used in a formulated system with a plasticizer. The nature of the PVC, the plasticizer, and the proportions of the two materials are chosen to provide a PVC composition having the desired properties for a particular application. Examples of the major uses of plasticized PVC compositions include wire and cable coating, other electrical applications such as plugs, film, foil and sheeting, flooring, wall covering, roofing and membranes. Other uses include films such as stationary films, adhesives tapes and agricultural films. Additionally, PVC is used in medical applications such as blood bags, tubing and bottle caps, footwear, pipe and guttering and fabric coating. In addition to plasticizers, other additives such as thermal stabilizers, lubricants, pigments, fillers, impact modifiers, and flame retardants are generally employed to produce PVC compositions having desired properties.

Plasticizers added to PVC confer desirable properties such as flexibility, softness, good feel and ease of processability, extensibility and lower melting temperature [Encyclopedia of PVC Vol 1 and 2, L. I. Nass (1976)]. Plasticizers function by dissolving in PVC, reducing the cohesive energy density between the polymer chains, and reducing the polar forces exerted by the chlorine atoms. Organic compounds that function as an effective PVC plasticizers generally exhibit (a) high miscibility with PVC, (b) polar groups, and (c) a low tendency to diffuse and migrate out of the polymer during its effective service life. In addition, it is desired that the plasticizer not discolor PVC, be non-toxic, be odorless, possess low volatility, and be thermally stable at the temperature of mixing and compounding of PVC with the plasticizer.

A variety of organic compounds have been reported as effective plasticizers for PVC. These include esters of phthalic anhydride with aliphatic alcohols (both linear and branched) with four to fifteen carbon atoms, epoxidized soybean oil, esters of trimellitic acids, phosphates, esters of benzoic and citric acids, and halogenated hydrocarbons. Higher molecular weight polyesters, from 800 atomic mass units (amu) to 6000 amu, may prepared by condensation of diols with adipic or sebacic acids are also used as plasticizers.

Of these, phthalate-based plasticizers are the most widely used because of their excellent compatibility with PVC, ease of fusion, and overall desirable properties. Examples of phthalate esters that are used include di-octyl phthalate, di-isononyl phthalate (DINP), di-isodecyl phthalate, di-isooctyl phthalate, di-isoheptyl phthalate and di-2-ethyl hexyl phthalate (DEHP). Typical commercial materials include the Flexidone® family of plasticizers by International Specialty Products, Jayflex® plasticizers available from ExxonMobil Chemical, and the Palatine® plasticizers marketed by BASF.

While phthalate compounds are a predominant plasticizer, they are not without drawbacks. DEHP has been implicated as a carcinogen, causing liver cancer in rats. Their low molecular weights enable them to diffuse out of PVC rapidly and cause "fogging" (cloudy deposits) on glass and other transparent surfaces. Also, they are easily extracted by organic solvents, making them unsuitable for use in applications requiring solvent contact.

The prior art in the plasticizer field is typified by U.S. Pat. Nos. 5,777,014; 6,118,012; 6,706,815; and U.S. patent applications 2004/0001948 and 2004/0198909.

U.S. Pat. No. 5,294,644 discloses surface active lactams which have particularly effective surfactant activity for active organic compounds such as agriculture chemicals and drugs. Many other interesting properties are attributed to such lactams including anti-stat, anti-block and lubricant properties. The particular utility for these lactams was its ability to form stable emulsion concentrates of water insoluble agricultural chemicals.

U.S. Pat. No. 7,411,012, which is incorporated herein its entirety by reference, describes N-alkyl-2-pyrrolidone plasticizers which provide long term plasticization to PVC so as to impart flexibility, softness, extensibility and or/lower melting temperature to PVC compositions.

U.S. Pat. No. 7,211,140, which is incorporated herein its entirety by reference, describes a method for plasticizing PVC comprising forming a mixture of PVC with an aliphatic diester of a monounsaturated aliphatic dicarboxylic acid, and fusing the mixture to give the plasticized PVC.

PCT/US09/39600 filed Apr. 6, 2009 and incorporated herein its entirety by reference, describes stable plasticized PVC compositions featuring an alkyl pyrrolidone and a phosphite ester.

A significant advancement in plasticizing polymers such as PVP would be provided by a plasticizing system that improves the polymer's plastic performance with reduced and/or eliminated physiological concerns. Even more significant would be a new class of plasticizers that increase the polymer's tensile strength and/or elongation at break.

Also desired are plasticized polymer compositions that exhibit lower solubilizing temperature, lower processing temperature, lower indentation hardness, while improving cold-temperature flexibility. Especially desirable would be plasticizers that additionally reduce the gelling temperature or improve the toughness of hard PVC.

Accordingly, it is an object of this invention to provide long term plasticization to PVC so as to impart flexibility, softness, extensibility and/or lower melting temperatures to PVC compositions.

Another object herein is to provide such plasticized PVC compositions for such applications as films, siding, sheets, pipe and tubing as well as calendered sheets, plastisols, foams and dispersions.

SUMMARY OF THE INVENTION

It has been discovered that unexpectedly increased hardness, tensile strength or stretchability, and/or lowered cold-crack temperature can be obtained by incorporating at least one N-alkyl-2-pyrrolidone and at least one fatty acid ester into PVC-based compositions. The present invention also provides heat stable plasticized PVC compositions which are cost effective, environmentally safe, and free of metal components and volatile organic carbons (VOCs).

Preferably, the composition of the present invention includes a fatty acid ester in an amount from about 1 part per hundred parts resin (phr) to about 100 phr and more preferably from about 2 phr to about 90 phr.

The present invention provides stable N-alkyl-2-pyrrolidone plasticized PVC compositions having higher hardness, higher tensile strength, higher elongation at break, or a reduced cold-crack temperature, or any combination thereof of these properties.

The present invention also provides such stable plasticized compositions for applications such as films, siding, sheets, pipe and tubing as well as calendered sheets, plastisols, foams and dispersions in a film, siding, pipe or tubing and the like.

BRIEF DESCRIPTION OF THE DRAWINGS

FIGS. 4A and 4B are graphs of complex viscosity as a function of temperature for compositions produced in accordance with Example 5.

DETAILED DESCRIPTION OF THE INVENTION

Figure 1:
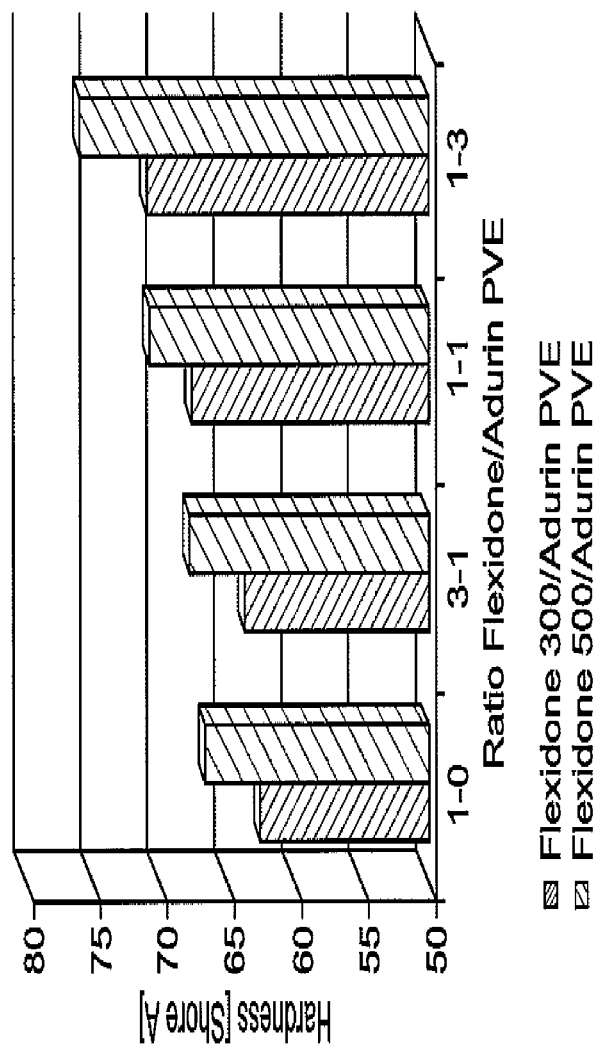
FIG. 1 is a bar chart of Shore Hardness A as a function of plasticizer ratio for compositions produced in accordance with Example 1.

It has been discovered that synergistic results are obtained when fatty acid esters are used in conjunction with N-alkyl-2-pyrrolidone plasticizers in polymeric compositions, especially polymeric compositions that comprise PVC.

This invention provides improved plasticized polymeric compositions that exhibit beneficial properties, including: a decrease in:
  gelation time,
  cold flexibility temperature,
  processing temperature,
  plasticizer use,
  volatility at elevated temperature, and/or
  dry blending and compounding time and energy expenditure
and/or an increase in:
  hardness,
  gelation at lower temperature,
  flexibility at low temperature,
  clarity/transparency, and/or
  filler load capacity.

By the approach of this invention polymeric compositions can be plasticized without the use of phthalates.

In particular, compositions of the invention exhibit improved tensile strength and stretchability and lowered cold-crack temperatures. Preferred compositions of the invention exhibit any two of these three properties, while the invention's most highly preferred compositions embody all three of the three mentioned properties.

The N-alkyl-2-pyrrolidones useful in the practice of this invention can be represented by structure (1):

(1)

wherein R is any linear alkyl, branched alkyl, or cycloalkyl group. Preferred N-alkyl-2-pyrrolidones as plasticizers include C4-C30 N-alkyl-2-pyrrolidones. Several N-alkyl-2-pyrrolidones are commercially-available, and include N-methyl-2-pyrrolidone (M-Pyrol®), N-ethyl-2-pyrrolidone (NEP®), N-cyclohexyl-2-pyrrolidone (CHP®), N-octyl-2-pyrrolidone (Surfadone® LP-100, Flexidone® 100), N-dodecyl-2-pyrroldidone (Surfadone® LP-300, Flexidone® 300), and linear C12-C14 N-alkyl-2-pyrrolidones (Flexidone® 400), and linear C16-C18 N-alkyl-2-pyrrolidones (Flexidone® 500), all of which are registered trademarks of International Specialty Products (Wayne, N.J.).

The carbonyl on the lactam ring causes electron delocalization, resulting in a dipole moment:

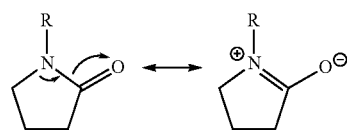

Consequently, the N-alkyl-2-pyrrolidone molecule possesses both a non-polar chain and a hydrophilic head group. Without being bound by theory, it appears that this combination enables N-alkyl-2-pyrrolidone to synergistically interact with both a polymeric entity, like PVC, and the fatty acid ester component of the invention.

These N-alkyl-2-pyrrolidones can be present in an amount of 1 phr-400 phr, more preferably, 10 phr-100 phr of the PVC. This amount is sufficient to effectively plasticize the polymer as required by the desired application.

It is contemplated that this invention can be practiced with a variety of C1-C10 linear or branched, cyclic or acyclic, saturated or unsaturated, alkyl esters of C8-C22 saturated or unsaturated fatty acids such as caprylic acid, capric acid, lauric acid, myristic acid, palmitic acid, stearic acid, arachic acid, behenic acid, lignoceric acid, oleic acid, linoleic acid, erucic acid, linolenic acid, and the like. Alkyl includes unsubstituted and substituted alkyl and includes alkyl containing one or more unsaturated positions in the alkyl chain(s) and/or one or more ether linkages in the alkyl chain(s).

A preferred fatty acid ester useful herein is Adurin® PVE, commercially available from BYK Additives & Instruments (Altana, Del.). It is believed that this material comprises primarily the methyl ester of octadecenoic acid in combination with smaller amounts of the methyl ester isomers of octadecadienoic acid and octadecatrienoic acid.

The fatty acid ester can be used preferably in an amount from about 1 phr to about 100 phr, and more preferably from about 2 phr to 90 phr. The stable N-alkyl-2-pyrrolidone plasticized polymer preferably has prolonged heat stability at temperatures higher than from about 180° C. Excellent early color and clarity can be achieved by using a fatty acid ester in combination with N-alkyl-2-pyrrolidones in plasticized PVC.

In a preferred embodiment, the weight ratio of N-alkyl-2-pyrrolidone to fatty acid ester is from 100:1 to 20:80. Excellent results have been observed when the weight ratio of N-alkyl-2-pyrrolidone to fatty acid ester is 50:50 at combined use levels of 40 phr and 60 phr, i.e., 20 ph N-alkyl-2-pyrrolidone with 20 phr fatty acid ester, and 30 phr N-alkyl-2-pyrrolidone with 30 phr fatty acid ester.

The compositions of this invention may further comprise secondary plasticizers, stabilizers, lubricants, flame retardants, pigments, and other compounding ingredients, especially those ingredients known for use in PVC compositions. Suitably this amount of plasticizer will form advantageous plasticized PVC in such diverse forms as calendered sheets, plastisols, foams and dispersions, in applications such as films, siding, pipe or tubing to impart flexibility, softness, extensibility and lower melting temperature to the PVC.

The term "stable" as used herein refers to the N-alkyl-2-pyrrolidone plasticized and organic phosphite stabilized PVC having early color which is significantly better than other conventionally used stabilizers. The better or no change in the color of the PVC after plasticization reflects its heat stability. In other words, stability refers to the long term heat stability at temperatures higher than from about 140° C. to about 200° C.

Preferred compositions of this invention exhibit an elongation at break of greater than 400%. Some compositions have an elongation at break of greater than 450%. Compositions having an elongation at break of about 500% have been prepared in accordance with this invention.

Compositions of the invention possess a Shore Hardness A of about 62 points or more.

Additionally, compositions of the invention possess an enhanced tensile strength of about 8 MPa or more. Tensile strength can be enhanced, in part, by proper selection of the particular N-alkyl-2-pyrrolidone and the weight ratio of the N-alkyl-2-pyrrolidone to fatty acid ester.

Low-temperature foldability tests with plasticized PVC compositions of the invention did not break or crack at −60° C. and lower for all samples at 60 phr total plasticizer level (50:50 N-alkyl-2-pyrrolidone to fatty acid ester). At a total plasticizer level of 40 phr (50:50 N-alkyl-2-pyrrolidone:fatty acid ester), most of the compositions did not break or crack at −60° C.

The invention composition may be used effectively in such applications as insulations and jackets for wire and cable; liners for pools, ponds, landfill, irrigation trenches; sheeting for waterbeds; fabric coating; carpet backing; automotive parts like dashboards, door panels, arm rests and other; car underbody coating; tiles; wall coverings; flooring sheets; packaging films; conveyor belts; tarpaulins; roofing membranes; electrical plug and connections; inflatable shelters; toys; garden hose; pipes and tubings; agricultural films; refrigerator and freezer gasketing; shoe soles and uppers, boots; fishing lures manufactured by using one of the state of the art technologies like calendering, extrusion, plastisol, foam, and dispersion.

The following Examples further illustrate the invention.

EXAMPLES

Example 1

The hardnesses of two PVC-based formulation systems were measured using Deutsches Institut fur Normung (DIN) method 53,505. Four compositions were plasticized with N-dodecyl-2-pyrroldidone (Flexidone® 300) and increasing amounts of methyl ester of octadecenoic acid in combination with smaller amounts of the methyl ester isomers of octadecadienoic acid and octadecatrienoic acid (Adurin® PVE, hereafter referred to in the Examples as "the fatty acid ester of Example 1"), while four compositions were plasticized with linear C16-C18 N-alkyl-2-pyrrolidones (Flexidone® 500) and the same levels of the fatty acid ester. The total plasticizer content was 60 phr.

In each formulated system, addition of the fatty acid ester increased the Shore Hardness A value (FIG. 1). Compositions of the invention have a Shore Hardness A of 62 points or more. An +8-point increase in Shore Hardness A was found by increasing the ratio of N-dodecyl-2-pyrroldidone:fatty acid ester from 1:0 to 1:3. The same ratio increase with the linear C16-C18 N-alkyl-2-pyrrolidones formulated system increased Shore Hardness A by +9 points.

Example 2

Tensile strength was measured for the same (but previously untested) compositions of Example 1 using DIN method 53,504.

Figure 2:
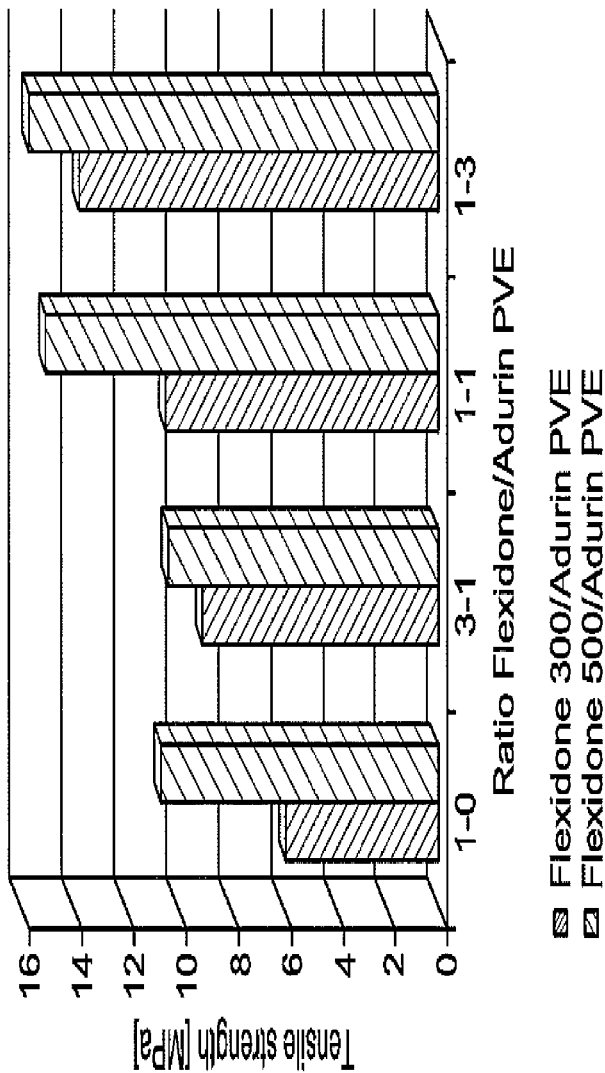
FIG. 2 is a bar chart of tensile strength as a function of plasticizer ratio for compositions produced in accordance with Example 2.

Addition of the fatty acid ester produced significant increases in tensile strength for both formulated systems (FIG. 2). Compositions of the invention have a tensile strength of 8 MPa or more. An +8-MPa increase in tensile strength was measured by increasing the ratio of N-dodecyl-2-pyrroldidone:fatty acid ester from 1:0 to 1:3. The same ratio increase with the linear C16-C18 N-alkyl-2-pyrrolidones samples increased tensile strength by +5 MPa.

Even more surprising, the (linear C16-C18 N-alkyl-2-pyrrolidones+the fatty acid of Example 1) increased tensile strength at the 1:1 ratio.

Example 3

Elongation at break was measured concurrently with tensile strength reported in Example 2.

Compositions of the invention have an elongation at break of 200% or more.

Figure 3:
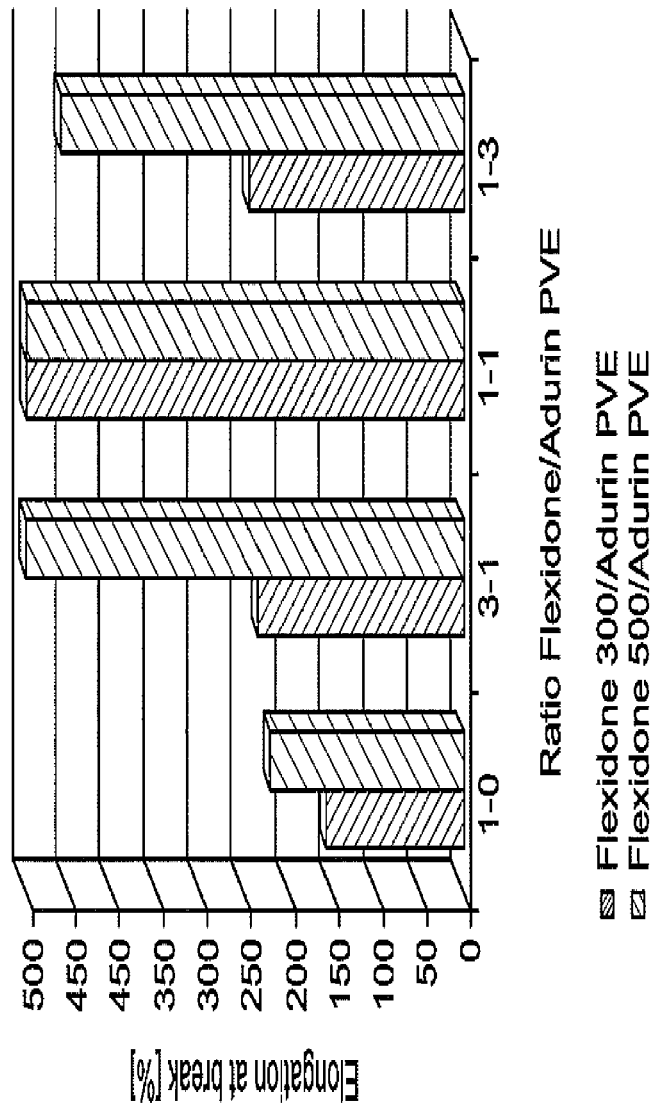
FIG. 3 is a bar chart of elongation at break as a function of plasticizer ratio for compositions produced in accordance with Example 3.

The N-alkyl-2-pyrrolidone+the fatty acid ester of Example 1 compositions resulted in an unexpected rubber-like behavior in elongation at break (FIG. 3). For the N-dodecyl-2-pyrroldidone formulation system, elongation at break increased from 150% (1:0) to almost 500% (1:1). A similar trend was observed for the linear C16-C18 N-alkyl-2-pyrrolidones formulation system, from 210% to almost 500%.

Example 4

Low-temperature foldability tests were performed on two formulated PVC compositions. The first contained PVC and N-dodecyl-2-pyrroldidone with and without the fatty acid ester of Example 1, while the second contained PVC and linear C16-C18 N-alkyl-2-pyrrolidones with and without the same fatty acid ester. Two total plasticizer levels were evaluated, 40 phr and 60 phr, each with equal mass ratios of N-alkyl pyrrolidone to fatty acid ester.

The plasticized PVC compositions did not break or crack at −60° C. and lower for all samples at 60 phr total plasticizer. At a total plasticizer level of 40 phr, most of the compositions did not break or crack at −60° C.

Example 5

The complex viscosity was measured as a function of temperature for 3 plastisol formulation systems:
PVC with 60 phr DINP,
PVC with 50 phr of (N-dodecyl-2-pyrroldidone+the fatty acid ester of Example 1) (in ratios of 1:3, 1:1, and 3:1), and PVC with (50 phr of C16-C18 N-alkyl-2-pyrrolidones+the same fatty acid ester) (in ratios of 1:3, 1:1, and 3:1).

The increase in complex viscosity, indicative of gelation, shifted to lower temperature for the formulation systems based on N-alkyl-2-pyrrolidone+fatty acid ester (FIGS. 4A and 4B). A desired gelation onset temperature can be attained by proper selection of the types of N-alkyl-2-pyrrolidone and fatty acid ester, and their mass ratios, and addition level.

Recommended blends for plastisol applications are:
N-dodecyl-2-pyrroldidone+the fatty acid ester of Example 1: from 50:50 to 30:70
C16-C18 N-alkyl-2-pyrrolidones+the same fatty acid ester: from 70:30 to 40:60

The invention has been described in detail with particular reference to preferred embodiments thereof, but it will be understood that variations and modifications can be effected within the spirit and scope of the invention. For example, it is believed that functional derivatives of N-alkyl-2-pyrrolidones (e.g., N-hydroxyethyl-2-pyrrolidone) and other N-alkyl-2-lactams (e.g., N-ethyl-2-caprolactam) are equivalents to the N-alkyl-2-pyrrolidones described herein.

What is claimed is:

1. A plasticized polymer composition comprising: (a) an N-alkyl-2-pyrrolidone; and (b) a fatty acid methyl ester; wherein the weight ratio of said N-alkyl-2-pyrrolidone to said fatty acid methyl ester is from about 1:1 to about 1:3 and wherein the plasticized polymer composition has a Shore Hardness A greater than 70 points or more and a tensile strength of about 8 MPa or more.

2. The composition of claim 1 wherein said polymer comprises poly(vinyl chloride).

3. The composition of claim 1 wherein said N-alkyl-2-pyrrolidone is a C4-C30 linear N-alkyl-2-pyrrolidone, a C4-C30 N-branched alkyl-2-pyrrolidone, or C4-C30N-cycloalkyl-2-pyrrolidone.

4. The composition of claim 3 wherein said N-alkyl-2-pyrrolidone is present in an amount from about 1 phr to about 400 phr.

5. The composition of claim 1 wherein said fatty acid methyl ester comprises the methyl ester of octadecenoic acid, the methyl ester of octadecadienoic acid, or the methyl ester of octadecatrienoic acid.

6. The composition of claim 5 wherein said fatty acid methyl ester comprises the methyl ester of octadecenoic acid, the methyl ester of octadecadienoic acid, and the methyl ester of octadecatrienoic acid.

7. The composition of claim 1 wherein said N-alkyl-2-pyrrolidone is present in an amount from about 20 phr to about 30 phr.

8. The composition of claim 1 wherein said fatty acid methyl ester is present in an amount from about 1 phr to about 100 phr.

9. The composition of claim 1 having an elongation at break of about 200% or more.

10. The composition according to claim 1 having a cold-crack temperature less than −60° C.

11. The composition of claim 1 that further comprises one or more secondary plasticizers, stabilizers, lubricants, flame retardants, pigments, or other compounding ingredient.

12. The composition of claim 1 in the form of a calendered sheet, plastisol, foam, dispersion, coating, film, foil, tube, membranes, flooring, gasket, paint, adhesive, textile, textile auxiliary, or fabric.

* * * * *